US012622836B2

(12) United States Patent
Brossette et al.

(10) Patent No.: US 12,622,836 B2
(45) Date of Patent: May 12, 2026

(54) METHODS FOR GENERATING A TRAJECTORY OF AN EXOSKELETON AND FOR SETTING THE EXOSKELETON IN MOTION

(71) Applicant: WANDERCRAFT, Paris (FR)

(72) Inventors: Stanislas Brossette, Paris (FR); Guilhem Boeris, Paris (FR)

(73) Assignee: WANDERCRAFT, Paris (FR)

( * ) Notice: Subject to any disclaimer, the term of this patent is extended or adjusted under 35 U.S.C. 154(b) by 917 days.

(21) Appl. No.: 17/796,008

(22) PCT Filed: Feb. 10, 2021

(86) PCT No.: PCT/FR2021/050242

§ 371 (c)(1),
(2) Date: Jul. 28, 2022

(87) PCT Pub. No.: WO2021/160967

PCT Pub. Date: Aug. 19, 2021

(65) Prior Publication Data

US 2023/0069928 A1 Mar. 9, 2023

(30) Foreign Application Priority Data

Feb. 10, 2020 (FR) .................................... 2001317

(51) Int. Cl.
*A61H 1/02* (2006.01)

(52) U.S. Cl.
CPC ... *A61H 1/0266* (2013.01); *A61H 2201/1602* (2013.01)

(58) Field of Classification Search
CPC ...................... A61H 1/0266; A61H 2201/1602
See application file for complete search history.

(56) References Cited

U.S. PATENT DOCUMENTS

2010/0113980 A1* 5/2010 Herr ...................... G01L 5/0028 600/587
2015/0127018 A1 5/2015 Lim et al.
(Continued)

FOREIGN PATENT DOCUMENTS

CN 109512643 A 3/2019
EP 1504858 A1 2/2005
(Continued)

OTHER PUBLICATIONS

PCT Search Report in related PCT Application No. PCT/FR2021/050242, mailed May 25, 2021.
(Continued)

*Primary Examiner* — Jerrah Edwards
*Assistant Examiner* — Aren Patel
(74) *Attorney, Agent, or Firm* — Thomas | Horstemeyer, LLP

(57) ABSTRACT

The present invention relates to a method for generating a trajectory of an exoskeleton (1) provided with two legs each having a foot, the method comprising the implementation by data-processing means (11*a*) of a server (10*a*), of steps of:

(a) obtaining at least one n-tuple of gait parameters defining a given gait of the exoskeleton (1);
(b) generating at least one periodic elementary trajectory of the exoskeleton (1) for said n-tuple of gait parameters, such that said periodic elementary trajectory comprises in sequence a first trajectory portion and a second trajectory portion, such that in the first trajectory portion each foot performs a pure rotation, and in the second portion only one foot performs a translation.

12 Claims, 4 Drawing Sheets

(56) References Cited

U.S. PATENT DOCUMENTS

| | | | | |
|---|---|---|---|---|
| 2015/0265428 | A1 | 9/2015 | Akiba | |
| 2016/0250094 | A1 * | 9/2016 | Amundson | A61H 1/024 623/24 |
| 2018/0092536 | A1 * | 4/2018 | Sandler | G08C 17/00 |
| 2019/0003002 | A1 | 1/2019 | Seo | |
| 2019/0083002 | A1 | 3/2019 | Jang et al. | |
| 2019/0283247 | A1 * | 9/2019 | Chang | A61B 5/1121 |
| 2020/0085666 | A1 * | 3/2020 | Seo | A61B 5/6829 |

FOREIGN PATENT DOCUMENTS

| | | | |
|---|---|---|---|
| EP | 1510446 | A3 | 10/2009 |
| JP | 2011079092 | A | 4/2011 |
| JP | 2013208292 | A | 10/2013 |
| JP | 2015089510 | A | 5/2015 |
| JP | 2015177863 | A | 10/2015 |
| JP | 2019055176 | A | 4/2019 |
| JP | 2019-77037 | A | 5/2019 |
| KR | 20170008941 | A | 1/2017 |
| KR | 10-2019-0120191 | A | 10/2019 |
| WO | 2010027968 | A2 | 3/2010 |
| WO | 2014/109799 | A1 | 7/2014 |
| WO | 2018/130784 | A1 | 7/2018 |

OTHER PUBLICATIONS

French Search Report in related French Application No. FR 2001317, mailed Oct. 7, 2020.

Kajita, Shuuji, et al., "Biped Walking Pattern Generation by using Preview Control of Zero-Moment Point", Proceedings of the 2003 IEEE International Conference on Robotics & Automation, Taipei, TW, Sep. 14-19, 2003, pp. 1620-1626.

Chinese Office Action in related Chinese Application No. 202180013629.8, mailed May 14, 2025.

* cited by examiner

METHODS FOR GENERATING A TRAJECTORY OF AN EXOSKELETON AND FOR SETTING THE EXOSKELETON IN MOTION

CROSS REFERENCE TO RELATED APPLICATIONS

This application is the 35 U.S.C. § 371 national stage application of PCT Application No. PCT/FR2021/050242, filed Feb. 10, 2021, which application claims the benefit of French Application No. FR 2001317 filed Feb. 10, 2020, both of which are hereby incorporated by reference herein in their entireties.

TECHNICAL FIELD GENERAL

The present invention relates to the field of robots of the exoskeleton type.

More precisely, it relates to a method for generating a trajectory of an exoskeleton and a method for setting the exoskeleton in motion.

STATE OF THE ART

Recently, for persons with substantial mobility problems such as paraplegics, assisted devices for walking called exoskeletons have appeared, which are external robotic devices that the operator (the human user) "puts on" thanks to a system of fasteners that links the movements of the exoskeleton with their own movements. Exoskeletons of lower limbs have several articulations, generally at least at the knees and hips, to reproduce the gait movement. Actuators make it possible to move these articulations, which in turn cause the operator to move. An interface system allows the operator to give orders to the exoskeleton, and a command system transforms these orders into commands for the actuators. Sensors also supplement the device.

These exoskeletons constitute progress with respect to wheelchairs, because they allow the operators to stand up and walk. Exoskeletons are no longer limited by wheels and can theoretically move about in most non-flat environments: wheels, contrary to legs, do not make it possible to cross substantial obstacles such as steps, stairs, obstacles with an excessive height, etc.

However, in their use, none of these exoskeletons performs an autonomous human gait, i.e. stable and viable over a large variety of terrains, that is anthropomorphic and unassisted.

In most cases, these limitations are materialised by the impossibility for the device to manage the balance or the direction of gait itself. These two tasks are then generally transferred to the operator, who performs them thanks to crutches, as proposed for example in U.S. Pat. No. 7,153,242 of Rewalk, or in application US2016038371 of Ekso-Bionics.

Patent EP2231096 of Rex-Bionics describes the only exoskeleton that can be used without external aid for a person that is incapable of assuring their own stability. The control principle, described in paragraph [0122], clearly explains the need to transfer the centre of pressure (the physical point at which the moment of the reaction forces exerted by the ground on the system is zero) from a portion of the support polygon (the convex envelope of the contact points with the ground) to another portion of the support polygon.

This limitation imposes an extremely slow gait (a few metres per minute, while a normal gait exceeds 2 km/h which is 33 metres per minute) with short steps (less than 30 cm, while a normal stride ranges from 50 to 80 cm), during which the support foot is constantly in flat contact with the ground. The type of environment that can be accessed is therefore limited, since uneven terrains are excluded de facto. Likewise, the slightest obstacle such as a stone, a small object, generates a risk of unbalancing the system if it places its foot on it at a given moment, and finally causes it to fall.

In opposition, "natural" human gait is characterised by a sequence of phases during which the feet can be flat on the ground, in the air, or in the process of rolling on the ground, as can be seen in FIG. 1. This capacity to roll the foot is essential for the gait because it makes it possible to take greater steps and allows for stability over a large variety of terrains.

However the so-called first-generation exoskeletons described hereinabove do not have an actuated foot or keep the support foot on the ground.

Performing this roll is indeed complex for bipedal humanoid robots or robotic devices. Even if a foot structure with a break as proposed in application WO2015140353 is provided, when the centre of pressure reaches the limit of the support polygon, the system begins to roll around this point, and is therefore no longer in static equilibrium.

In the case of the gait, the roll of the foot involves a partial loss of contact with the ground at the support foot, with several consequences:

- the support polygon (the sustentation surface) is reduced, potentially to a point, making it difficult if not impossible to maintain the centre of pressure inside the support polygon;
- the system is in a situation of underactuation, i.e. it can no longer act over all its degrees of freedom. All the movements are then no longer possible.

In such a situation, the conventional formalisms of flat foot walking such as described in the document Kajita S., K. F. (2003). Biped Walking pattern generation by using preview control of Zero-Moment Point. ICRA, (pp. 1620-1626), or the principle described in patent Rex-Bionics EP2231096 can no longer operate.

A natural idea is to bring the swinging leg in front and to pose the second foot on the ground to return to a support polygon and balance, this while the system is in free rotation around the support foot, somewhat in the process of "falling". This is then referred to as dynamic gait, since the body passes through a sequence of unstable postures, but only transiently (if "stopped" the person in the middle of a stride would fall).

In this dynamic gait approach, bringing the swinging foot quickly into a position that re-establishes the balance at least briefly is complicated. Indeed, if this foot is made to follow a trajectory configured in a pre-calculated time, this foot risks hitting the ground too early or too late due to the uncontrollable behaviour of the underactuated system even subjected to slight disturbances (it is not possible to correct a trajectory that would deviate slightly from what was planned). This can generate discomfort for the operator, unbalance them and even cause them to fall, including on simple terrain.

It is for this that all first-generation exoskeletons (and many humanoid robots) try to avoid this type of situation by keeping the support foot flat, with for consequences the aforementioned limitations on the gait speed, the length of the steps, the permissible type of terrain and the general stability of the gait.

A new gait paradigm for exoskeletons was consequently proposed in application WO2018130784, that combines the principles of "virtual constraints" and of "Hybrid Zero Dynamics" (HZD) allowing for a quick and natural gait, and without the risk of falling or imbalance even on difficult and unplanned terrain.

Conventionally, the trajectories, i.e. the changes in each degree of freedom, are expressed as a function of time. The "dynamics" of the system is defined by a function $$f:\chi\times U\times R^{+}\mapsto\chi$$

and a starting point $$\xi\in\chi$$

the function $f$ is written $$\dot{x}_t=f(x_t,u_t,t),x_0=\xi$$

$\chi$ being the state space of the exoskeleton 1, U the control space, and t representing time.

The HZD is on the contrary the dynamics of non-actuated degrees of freedom. This dynamics is said to be "Zero" since it corresponds to the degrees on which the command cannot/does not want to act, i.e. the command is 0, and "Hybrid" because the impact of the foot on the ground imposes discontinuous instantaneous phases that intersect the continuous phases.

In the so-called "virtual constraints" method, the principle is to define for a selection of actuated degrees of freedom a trajectory configured by a change parameter, not by time, but directly according to the configuration, this parameter being called phase variable. An example of such a phase variable is the angle between the heel-hip axis and the vertical which then constitutes a non-actuated degree of freedom mentioned hereinabove.

The phase variable makes it possible to define the "progress" of a step. More precisely, at each step, the phase variable switches continuously from an initial value to a final value, before it is assigned the initial value again: this is the beginning of the next step. To facilitate matters, the value of the phase parameter can be normalised between 0 and 1.

Each value of the change parameter corresponds to a value of the actuated degrees of freedom that the system must force itself to follow: it is these relationships (one for each actuated degree of freedom that is to be controlled in this way) that are called virtual constraints.

If the system exactly follows this trajectory for the degrees of freedom whereon it is possible or desired to act, in other terms if the virtual constraints are complied with for these degrees of freedom, then the change in the system is entirely determined by that of the non-actuated degrees of freedom that follow their own dynamics with is HZD.

A good choice of virtual constraints can thus lead this dynamics to contain an attractive periodic "orbit", i.e. a stable trajectory towards which the system is naturally attracted.

This method HZD provides great satisfaction, but the difficulty resides in the generating of trajectories (this is moreover also the case in the "flat foot" method). Indeed, it is observed that the trajectories obtained "hardly roll" the foot, i.e. the foot remains practically horizontal (the heel and the toes hardly clear the ground) contrary to the natural human gait shown in FIG. 1 mentioned hereinabove wherein the roll is marked.

However, the algorithms for generating trajectories in theory make perfectly possible a roll phase that is as marked as in a natural human gait, but because they are generally based on a method for optimising for non-convex, non-linear problems under constraint, they favour "optimum" trajectories that are considered as more stable to the detriment of more "anthropomorphic" trajectories, which would however be largely preferred by human operators of exoskeletons.

Thus, it would be desirable to have a new solution for generating trajectories that increases the natural side of the trajectories without harming the stability thereof.

Presentation of the Invention

The present invention thus according to a first aspect relates to a method for generating a trajectory of an exoskeleton provided with two legs each having a foot, the method comprising the implementation by data-processing means of a server, of steps of:

(a) obtaining at least one n-tuple of gait parameters defining a given gait of the exoskeleton;

(b) generating at least one periodic elementary trajectory of the exoskeleton for said n-tuple of gait parameters, such that said periodic elementary trajectory comprises in sequence a first trajectory portion and a second trajectory portion, such that in the first trajectory portion each foot performs a pure rotation, and in the second portion only one foot performs a translation.

According to advantageous and non-limiting characteristics:

Said elementary periodic trajectory cyclically repeats the sequence of said first trajectory portion then second trajectory portion.

In the second trajectory portion, the foot that performs the translation is the initially rear foot, the initially front foot performing a pure rotation.

Said initially front foot remains immobile during the second trajectory portion.

At the end of the first trajectory portion the front foot is flat on the ground.

The step (b) is implemented by using at least one neural network.

Said exoskeleton receiving a human operator, the step (a) comprising the determining of a sequence of n-tuples of gait parameters of the exoskeleton desired by said operator.

The generated trajectory of the exoskeleton comprises, for each n-tuple of said sequence, a new elementary periodic trajectory and a transition to this new elementary periodic trajectory.

According to a second aspect, the invention relates to a method for setting an exoskeleton in motion having a plurality of degrees of freedom of which at least one degree of freedom actuated by an actuator controlled by data-processing means comprising a step (c) of executing by the data-processing means of the exoskeleton of a trajectory of the exoskeleton generated by means of the method for generating a trajectory of the exoskeleton according to the first aspect, in such a way as to cause said exoskeleton to walk.

According to a third aspect, the invention relates to a system comprising a first server and an exoskeleton each comprising data-processing means, characterised in that said data-processing means are configured to implement a method according to the first aspect for generating a trajectory of the exoskeleton and/or a method according to the second aspect for setting an exoskeleton in motion.

According to a fourth and a fifth aspect, the invention relates to a computer program product comprising code instructions for the execution of a method according to the first aspect of generating a trajectory of an exoskeleton and/or a method according to the second aspect for setting an exoskeleton in motion; and a means of storage that can be read by a piece of computer equipment on which a computer program product comprises code instructions for the execution of a method according to the first aspect of generating a trajectory of an exoskeleton and/or a method according to the second aspect for setting an exoskeleton in motion.

PRESENTATION OF THE FIGURES

Other characteristics and advantages of the present invention shall appear when reading the following description of a preferred embodiment. This description will be given in reference to the accompanying drawings wherein.

DETAILED DESCRIPTION

Architecture

According to two additional aspects of the invention, the following are proposed:

- a method for generating a trajectory of an exoskeleton 1; and
- a method for setting an exoskeleton in motion 1 (applying a trajectory generated thanks to the method according to the first aspect).

Figure 2:
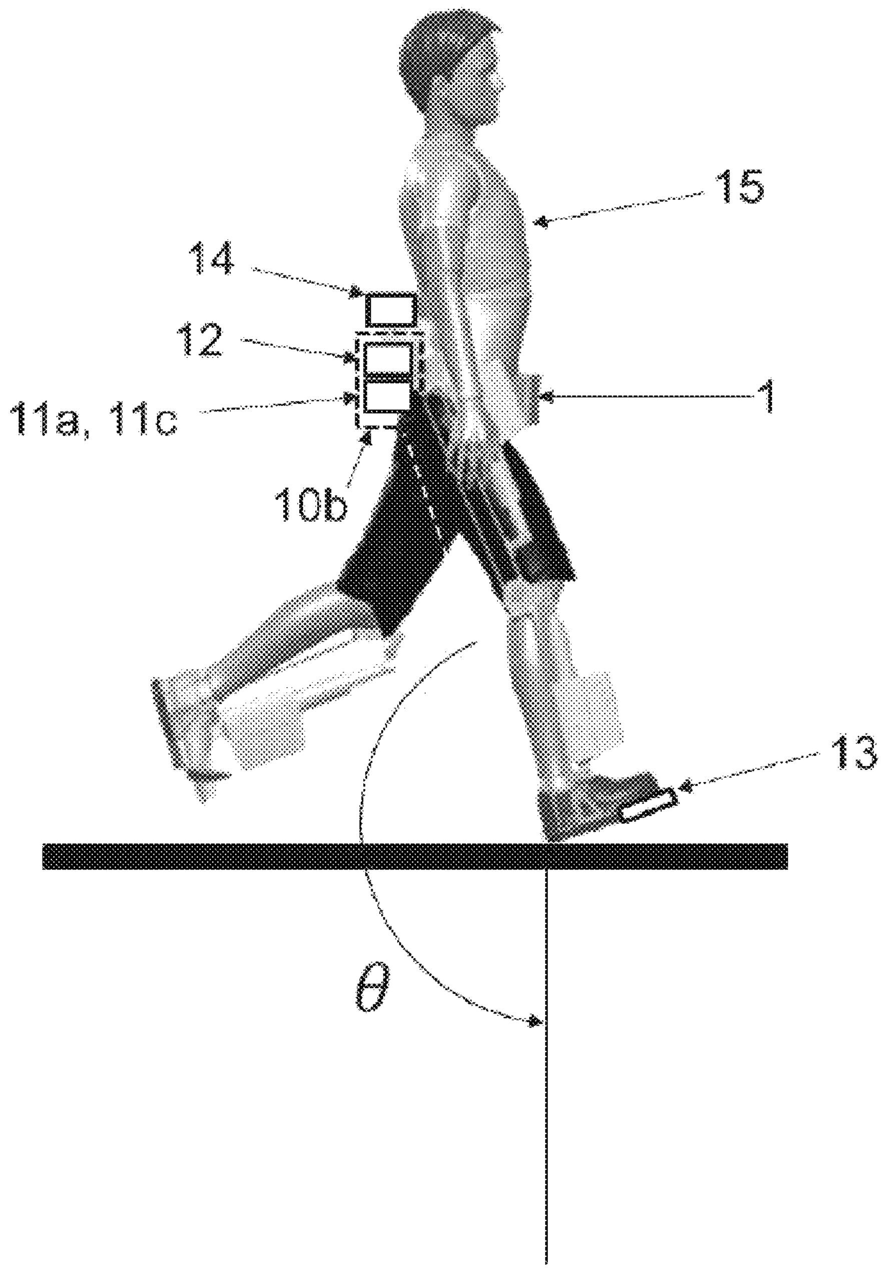
FIG. 2 is a diagram of an exoskeleton used by the methods according to the invention.

In reference to FIG. 2, said exoskeleton 1 is an articulated mechanical system of the bipedal robotic device type, actuated and controlled, provided with two legs, receiving more precisely a human operator having their lower limbs each solidly attached to a leg of the exoskeleton 1 (in particular thanks to straps). It can also be a more or less humanoid robot. The term “gait” here means setting the robotic device 1 in motion, which results in practice in an alternative support on the legs, in the standing position, in such a way as to produce a displacement.

The exoskeleton 1 has a plurality of degrees of freedom, i.e. deformable articulations (generally via a rotation) i.e. movable with respect to one another, which are each either “actuated”, or “non-actuated”.

Figure 1:
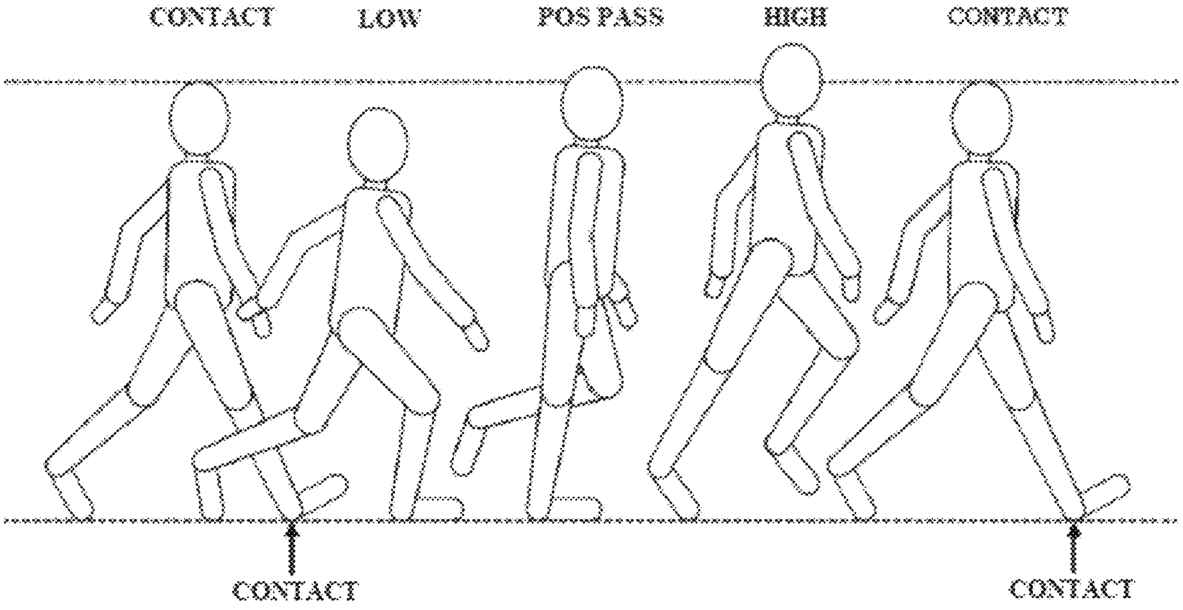
FIG. 1 shows the human gait.

An actuated degree of freedom designates an articulation provided with an actuator controlled by data-processing means 11*c*, i.e. this degree of freedom is controlled and it is possible to act thereon. On the contrary, a non-actuated degree of freedom designates an articulation devoid of an actuator, i.e. this degree of freedom follows its own dynamics and the data-processing means 11 do not have a direct control thereon (but a priori an indirect control via the other actuated degrees of freedom). In the example of FIG. 1, the heel-ground contact is punctual, and the exoskeleton 1 is thus free in rotation with respect to this contact point. The angle between the heel-hip axis and the vertical then constitutes a non-actuated degree of freedom.

The present exoskeleton naturally comprises at least one actuated degree of freedom, preferably a plurality, and also at least one non-actuated degree of freedom, i.e. it is “under-actuated”, as mentioned hereinabove. The number of non-actuated degrees of freedom is called degree of under-actuations.

The data-processing means 11*c* designate a piece of computer equipment (typically a processor, or external if the exoskeleton 1 is “remote controlled” but preferably embedded in the exoskeleton 1, see further on) adapted to process instructions and generate commands intended for the various actuators. The latter can be electric, hydraulic, etc.

The present application will not be limited to any architecture of exoskeleton 1, and the example shall be taken such as described in applications WO2015140352 and WO2015140353.

Thus, preferably and in accordance with these applications, the exoskeleton 1 comprises on each leg a foot structure comprising a support plan whereon a foot of a leg of the person wearing the exoskeleton can bear against.

This support plan comprises a front platform and a rear platform, such that a foot pivot connection connects the front platform to the rear platform, constituting a non-actuated degree of freedom.

Those skilled in the art will however know how to adapt the present method to any other mechanical architecture.

Figure 3:
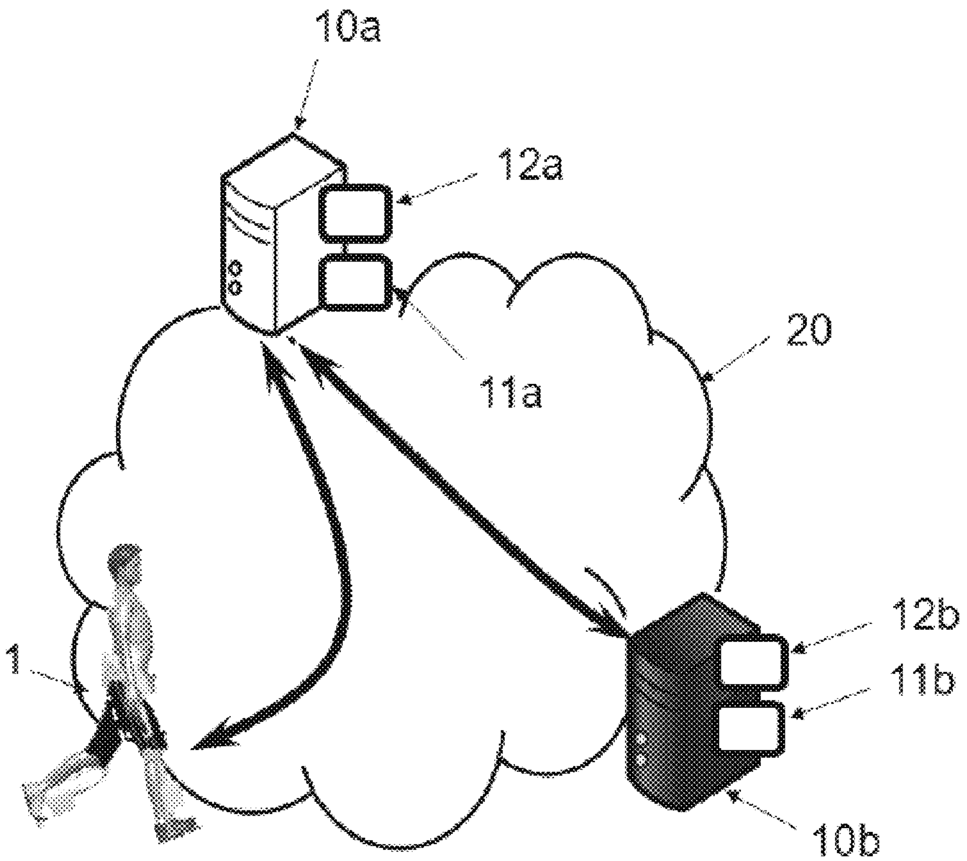
FIG. 3 is a diagram of an architecture for the implementation of the methods according to the invention.

According to a preferred embodiment, the present methods for generating trajectories and gait can involve a first and even a second server 10*a*, 10*b* within an architecture such as shown in FIG. 3.

The first server 10*a* is a server for generating trajectories, and the second server 10*b* is a possible learning server.

Indeed, generating a trajectory of the exoskeleton 1 can use a neural network, in particular of the “feedforward” type (FNN, “Feedforward Neural Network”), such as is proposed in application FR1910649. The second server 10*b* is then a server for the implementation of a method for learning parameters of said neural network. Note that the present method is not limited to the use of a neural network, and it is possible to use any known technique for generating the trajectory in its entirety, even further on.

In any case, it is entirely possible that these two servers be confounded, but in practice the second server 10*b* is most often a remote server while the first server 10*a* can be embedded by the exoskeleton 1 for operation in real time, such as is shown in FIG. 2. According to a preferred embodiment, the first server 10*a* implements the method for generating a trajectory of the exoskeleton 1 thanks to a neural network that uses the parameters retrieved from the second server 10*b*, and the exoskeleton 1 directly applies said trajectory generated in situ to set itself in motion.

Each one of these servers 10*a*, 10*b* is typically a piece of computer equipment connected to an extended network 20 such as the internet network for exchanging data, although in practice once the neural network is learned and embedded on the second server 10*b* the communication can be interrupted, at least intermittently. Each one comprises data-processing means 11*a*, 11*b* of the processor type (in particular the data-processing means 11*b* of the second server have a strong calculation power, because the learning is long and complex with respect to the simple use of the learned neural network), and where applicable means of data storage 12*a*, 12*b* such as a computer memory, for example a hard drive. In the case of generating a trajectory by a neural network, a learning database can be stored by the memory 12*b* of the second server 10*b*.

It is understood that there can be a plurality of exoskeletons 1 each embedding their first server 10*a* (which can then be of a limited power and size, in that it generates trajectories only for the exoskeleton 1 to which it is dedicated), or a plurality of exoskeletons 1 each connected to a more powerful first server 10*a* and possibly confounded with the second server 10*b* (and having the capacity to generate trajectories on the fly for all the exoskeletons 1).

Principle of the Invention

As explained, the term "trajectory" of the exoskeleton conventionally means the changes in each degree of freedom (in particular actuated) expressed as a function of time or of a phase variable.

Moreover, it is known how to define a "complex" trajectory as a sequence of periodic trajectories referred to as "elementary" intersected by transitions. The term "periodic trajectory" means any trajectory applied (where applicable repeatedly) over the duration of a step in such a way that starting from an initial state of the exoskeleton 1 at the beginning of a step (moment of foot contact), the same state is returned to at the beginning of the next step (as explained this encompasses any flat gait, but also on a ramp, going up or down stairs, etc.). It is also said that the periodic trajectory forms a "limit cycle". Thus, said periodic trajectory can be applied over any number of steps in a stable manner.

In other terms, each elementary trajectory is associated with a given gait of the exoskeleton 1 (a gait being defined by an n-tuple of gait parameters), and makes it possible to maintain this gait in a stable and feasible manner (i.e. as shall be seen complies with all the constraints of an optimisation problem and minimises as much as possible a cost function). As explained, said gait parameters correspond to "characteristics" of the way of walking, such as the length of the steps, the gait frequency and the inclination of the bust, but also the height of the steps in case of negotiating stairs, the instantaneous angle of rotation for curved movements; and also to the morphological characteristics of the operator (a sub-group of gait parameters referred to as patient parameters) such as their waist, their weight, the lengths of the thighs or tibias, the position of the centre of mass (value of the offset towards the front) and the lateral clearance of the bust in the framework of rehabilitation activity.

Said "constraints" of a gait mentioned hereinabove can be varied and depend on the type of gait desired, for example a "flat foot" gait, or "HZD". The present method will not be limited to any type of desired gait.

The transitions correspond to changes in gait, i.e. variations in the values of said gait parameters (for example an increase in the length of the step): knowing an initial set of gait parameters and a final set of gait parameters, and therefore an initial periodic trajectory (associated with the initial set of gait parameters) and a final periodic trajectory (associated with the final set of gait parameters), said transition is a trajectory fragment making it possible to switch from the initial periodic trajectory to the final trajectory. Note that there must be "initial" or "final" transitions, as shall be seen hereinafter.

The ingenuity at the base of the present method is to notice that it is possible to impose in a periodic elementary trajectory two sub-portions in such a way as to render it more clearly anthropomorphic. In a first portion of the trajectory called "roll" the two feet are in contact with the ground and each perform a movement of pure rotation: the rear foot (in contact with at least the "tip"—typically a front platform of the foot structure—and advantageously initially as full contact, i.e. flat) progressively lifts the heel and the front foot (in contact only at heel) progressively poses the tip (two first pictures of FIG. 1), then in a second portion referred to as "swing" or simply "step", the front foot remains in contact with the ground and the other is clear (this is referred to as "foot clearance") and performs a translation movement (which can of course include various rotations): in other terms, this initially rear foot breaks the contact with the ground, passes in front and returns to contact with the ground with the heel (last three images of FIG. 1). At this stage the two feet are in contact with the ground inversely to what was the case at the beginning of the first portion (the rear foot has become the front foot), but in an identical configuration (the rear foot is in contact at the tip and even flat, and the front foot is in contact only at the heel): a step has been taken and it is possible to repeat a first and a second portion symmetrically, and so on (giving the "periodic elementary" nature of the trajectory).

Note that the notion of "front" and "rear" is defined with respect to the direction of the gait: there is always a front foot and a rear foot, the latter are inversed at each step.

Thus, each elementary periodic trajectory is constructed from a first portion and from a second portion, the chaining of the first portion and of the second portion constituting a cycle that can be repeated (by inversing the left foot and right foot at each cycle).

The existence of these first and second portions can be imposed by adding conditions during the generation of the trajectory, and by applying the continuity of the trajectory parameters from one portion to another.

These conditions are advantageously as follows:

- For the first portion, pure rotation of each foot (even rotation according to a single axis of rotation), and preferably the front foot is flat at the end of the first portion;
- For the second portion, clearance and translation of only the (initially) rear foot, until it again touches the ground (by becoming the new front foot, leading to the word "initially"), during this time pure rotation of the (initially) front foot, even the front foot immobile.

Note that this breakdown into two portions is not what a human actually does, the two portions exist in fact in the actual human gait without however being as distinct (a portion of the rotation of the front foot is concomitant with the translation movement), but this "exaggeration" makes it possible in practice to force a gait of the exoskeleton 1 that is much more natural. Moreover, these conditions can appear to be very restrictive, but in actual conditions it is observed that the stability is not altered at all, and the generating of trajectories is not made more complicated.

As shall be seen, it is even possible to define these first and second portions in transitions, in particular the initial and final transitions.

First and Second Trajectory Portions

Figure 4:
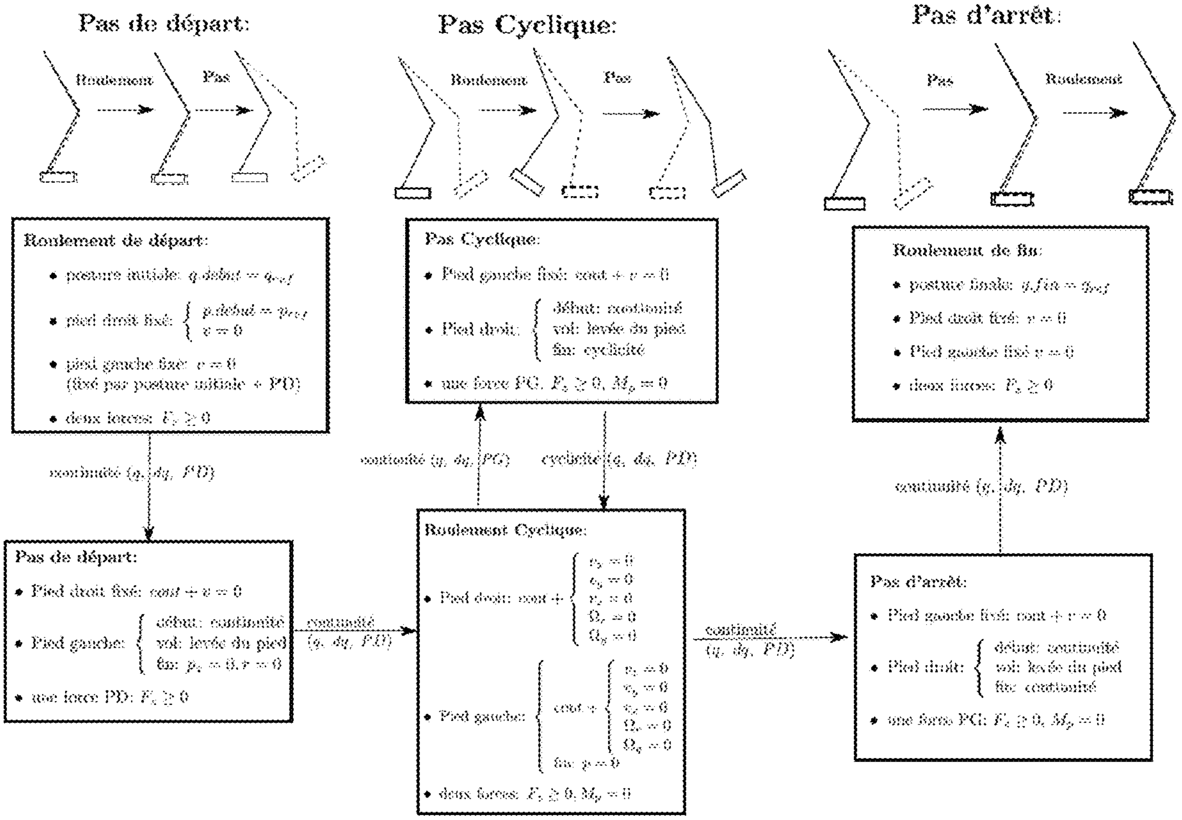
FIG. 4 is a diagram showing the structure of the problem of optimisation describing all the phases of a gait trajectory with rolling of the foot of the exoskeleton in an example embodiment of the invention.

FIG. 4 shows a preferred example of an initial transition, then a step, and a final transition. The step shall first be described, i.e. the elementary periodic trajectory, by beginning with the first portion (roll phase). In the example of FIG. 4, the left foot (dotted line—the right foot is in a solid line)) is the front foot. Those skilled in the art can naturally transpose the example to the case of the figure.

This is thus the case of the "cyclic roll" which defines the first portion of a periodic "cyclic" trajectory. The movements of each foot are defined on a trihedral by three speeds according to the three axes and three rotations according to the three axes. It can be seen that the following are imposed:

For the right (rear) foot, continuity and $v_x=v_y=v_z=\Omega_r=\Omega_y=0$, only $\Omega_x\neq 0$ to allow for the pure rotation;

For the left (front) foot, continuity and $v_x=v_y=v_z=\Omega_r=\Omega_y=0$, only $\Omega_x\neq 0$ to allow for the pure rotation, and output position p=0 i.e. foot flat ("zero" position).

Each foot is subjected during the movement to a non-zero vertical force that reveals the reaction of the ground on the foot.

When the front foot reaches the output position, control moves to the "cyclic step" case for the second portion of the periodic trajectory. It can be seen that the following are imposed:

For the left (front) foot, continuity and v=0, i.e. pure rotation.

For the right (rear) foot, continuity and foot clearance

The right foot is in the air in such a way that it is not subjected to any force.

This ends with a "cyclicity", i.e. the complete configuration of the exoskeleton 1 at the end of this second portion must be equal to the symmetry of the configuration at the beginning of the cyclic roll (first portion), and the cyclic roll is started again by inversing left foot (LF) and right foot (RF).

In the case of FIG. 4, it is assumed that this begins with an initial transition from a given starting posture (from an immobile position, standing, etc.). As explained it is possible to again have a first and a second portion of this transition, by analogy with the first and second portions of an elementary periodic trajectory. It is here supposed that this begins with a starting roll "with the left foot behind", but this is an arbitrary choice and the opposite could be done, the two feet being in practice generally side by side. As explained hereinabove on impose a pure rotation of the feet, but in practice it is even possible to have feet that remain immobile when flat, with only the pelvis being set into motion. The idea is to trigger the dynamics of the movement.

Then, this chains with the second portion of this initial transition (Starting step) wherein the right foot does not move (or at least performs only a pure rotation) and the left foot is clear until it reaches the ground again: the periodic trajectory can then be started and more precisely the first portion (cyclic roll).

Similarly, FIG. 4 shows the case of a final transition according to a periodic first trajectory portion. By symmetry with the initial transition, this is begun by the second portion (stopping step) to finish with the first portion (stopping roll). Note that the portion of stopping step is identical to the second portion of the periodic trajectory, with a fixed left foot and a right foot that is clear (again this is arbitrary, the complete opposite could be performed). The only difference is that in this type of transition the calculated movement generally sees the rear foot going only to the level of the foot in front, not beyond as in a gait. In the portion of stopping roll it is possible to again have at best a rotation of the feet, the exoskeleton 1 is immobilised until a final posture is reached (for example immobile position, standing, etc.).

Methods

According to a first aspect, the method for generating a trajectory of a trajectory of an exoskeleton 1 is proposed, implemented by the data-processing means 11*a* of the server 10*a*. Said method for generating a trajectory of a trajectory of an exoskeleton 1 begins with said step (c) of obtaining at least one n-tuple of gait parameters defining a given gait of the exoskeleton 1, even a sequence of n-tuples of gait parameters progressively (for example due to new commands from the operator of the exoskeleton).

In a main step (b), the method comprises generating at least one periodic elementary trajectory of the exoskeleton 1 for said n-tuple of gait parameters, as explained such that said periodic elementary trajectory comprises in sequence a first trajectory portion and a second trajectory portion, such that in the first trajectory portion each foot performs a pure rotation, and in the second portion only one foot performs a translation (foot clearance, the other performing a pure rotation even being immobile)

For a sequence of n-tuples, for each new n-tuple of parameters, a new periodic trajectory is determined and a transition to this new periodic trajectory.

For this, the method for generating a trajectory advantageously comprises the determining (where applicable repeated in a regular manner) of the n-tuple of gait parameters of the exoskeleton 1, i.e. the repetition of the step (a).

Indeed, although the exoskeleton 1 is an exoskeleton receiving a human operator, it is the posture of said human operator (and possibly the pressing of buttons) that determines said parameters (contrary to the case of a normal robot that can directly receive a start request comprising a gate speed and/or direction setpoint).

For this, the operator can be provided as explained with a sensor jacket 15 making it possible to detect the configuration of their bust (orientation of the latter). The direction wherein the operator orients their bust is that in which they wish to walk and the speed is given by the intensity with which they place their bust forward (to what extent they lean over). The start request can correspond to the operator pressing a button (or a particular posture) signalling their intention to begin walking and therefore ordering the data-processing means to determine said parameters. Certain parameters such as the instantaneous angle of rotation or the height of the steps in case of negotiating stairs can be predetermined or obtained by means of other sensors 13, 14.

The generating of the trajectory per se will not be limited to any known technique, the object of the invention being only to apply the aforementioned constraints during the generation in such a way as to obtain the first and second portions.

Optimisation tools as explained are in particular known, capable in particular of generating a given trajectory according to the gait constraints and parameters chosen. For example, in the case of HZD trajectories, the problem of generating trajectories is formulated in the form of an optimum control problem that can be resolved preferably by a so-called direct collocation algorithm, see the document Omar Harib et al., *Feedback Control of an Exoskeleton for Paraplegics Toward Robustly Stable Hands-free Dynamic Walking*.

As also explained, it is alternatively possible to use a neural network trained on a learning trajectory database.

Note that it is possible to consider using a first neural network to generate the first portion of a trajectory, and a second neural network to generate the second portion of a trajectory. It is thus sufficient to learn the first network on a learning base of first portions of trajectories, and the second network on a learning base of second portions of trajectories.

According to a second aspect, a method for setting an exoskeleton in motion 1 is proposed comprising the implementation of said method according to the second aspect for generating a trajectory of the exoskeleton (step (a), (b)), then (in a step noted as (c)) the execution of said trajectory in such a way that the exoskeleton 1 walks.

The steps (b) and (c) can be repeated in such a way as to correct the trajectory of the exoskeleton 1 always in real time.

Equipment and System

According to a third aspect, the invention relates to the system, for the implementation of the methods according to the first and/or the second aspect.

As explained, this system comprises a first server 10*a*, a possible second server 10*b* and an exoskeleton 1, possibly confounded.

The first server 10*a* comprises data-processing means 11*a* for the implementation of the method according to the first aspect.

The exoskeleton 1 comprises data-processing means 11*c* configured to implement the method according to the second aspect, as well as, if necessary, data-storage means 12 (in particular those of the first server 10*a*), inertial measuring means 14 (inertial measurement unit), means for detecting the impact of the feet on the ground 13 (contact sensors contact or possible pressure sensors), and/or a sensor jacket 15.

It has a plurality of degrees of freedom of which at least one degree of freedom actuated by an actuator controlled by the data-processing means 11*c* in the framework of implementing the method according to the third aspect.

Computer Program Product

According to a fourth and fifth aspects, the invention relates to a computer program product comprising code instructions for the execution (on the processing means 11*a*, 11*c*), of a method according to the first aspect for generating a trajectory of an exoskeleton 1 and/or of a method according to the second aspect for setting an exoskeleton 1 in motion, as well as means of storage that can be read by a piece of computer equipment on which this computer program product is found.

The invention claimed is:

1. A method for generating a trajectory of an exoskeleton provided with two legs each having a foot, the method comprising the implementation by data-processing means of a server, of steps of:

(a) obtaining at least one n-tuple of gait parameters defining a given gait of the exoskeleton;

(b) generating at least one periodic elementary trajectory of the exoskeleton for said n-tuple of gait parameters, while applying conditions such that said periodic elementary trajectory comprises in sequence a first trajectory portion and a second trajectory portion, such that:

in the first trajectory portion each foot performs a pure rotation, and in the second trajectory portion only one foot performs a translation starting with the foot that performs the translation being in contact with the ground only at a toe tip thereof and ending with the foot that performs the translation being in contact with the ground only at a heel thereof, while the foot that does not perform the translation remains immobile flat on the ground all along the second trajectory portion.

2. The method according to claim 1, wherein the conditions are such that said elementary periodic trajectory cyclically repeats the sequence of said first trajectory portion then second trajectory portion.

3. The method according to claim 1, wherein the conditions are such that, in the second trajectory portion, the foot that performs the translation is an initially rear foot of the exoskeleton that is positioned rear of an initially front foot of the exoskeleton at a beginning of the at least one periodic elementary trajectory.

4. The method according to claim 1, wherein the conditions are such that at the end of the first trajectory portion an initially front foot of the exoskeleton that is positioned in front of an initially rear foot of the exoskeleton at a beginning of the at least one periodic elementary trajectory is flat on the ground.

5. The method according to claim 1, wherein the step (b) is implemented by using at least one neural network.

6. The method according to claim 1, said exoskeleton receiving a human operator, the step (a) comprising the determining of a sequence of n-tuples of gait parameters of the exoskeleton desired by said operator.

7. The method according to claim 6, wherein the generated trajectory of the exoskeleton comprises for each n-tuple of said sequence a new elementary periodic trajectory and a transition to this new elementary periodic trajectory.

8. The method according to claim 1, wherein the step (b) is implemented by using optimization tools capable of generating the at least one periodic elementary trajectory according to said conditions and n-tuple of gait parameters.

9. A method for setting an exoskeleton in motion having a plurality of degrees of freedom of which at least one degree of freedom actuated by an actuator controlled by data-processing means comprising a step (c) of executing by the data-processing means of the exoskeleton of a trajectory of the exoskeleton, in such a way as to cause said exoskeleton (1) to walk, said trajectory of the exoskeleton being generated by the implementation of the steps of:

(a) obtaining at least one n-tuple of gait parameters defining a given gait of the exoskeleton;

(b) generating at least one periodic elementary trajectory of the exoskeleton for said n-tuple of gait parameters, while applying conditions such that said periodic elementary trajectory comprises in sequence a first trajectory portion and a second trajectory portion, such that:

in the first trajectory portion each foot performs a pure rotation, and in the second trajectory portion only one foot performs a translation starting with the foot that performs the translation being in contact with the ground only at a toe tip thereof and ending with the foot that performs the translation being in contact with the ground only at a heel thereof, while the foot that does not perform the translation remains immobile flat on the ground all along the second trajectory portion.

10. A system comprising a first server and an exoskeleton each comprising data-processing means, characterised in that said data-processing means are configured to implement a method for generating a trajectory of an exoskeleton provided with two legs each having a foot, the method comprising the implementation by data-processing means of a server, of steps of:

(a) obtaining at least one n-tuple of gait parameters defining a given gait of the exoskeleton;

(b) generating at least one periodic elementary trajectory of the exoskeleton for said n-tuple of gait parameters, while applying conditions such that said periodic elementary trajectory comprises in sequence a first trajectory portion and a second trajectory portion, such that:

in the first trajectory portion each foot performs a pure rotation, and in the second trajectory portion only one foot performs a translation starting with the foot that performs the translation being in contact with the ground only at a toe tip thereof and ending with the foot that performs the translation being in contact with the ground only at a heel thereof, while the foot that does not perform the translation remains immobile flat on the ground all along the second trajectory portion.

11. A computer program product comprising code instructions for the execution of a method for generating a trajectory of an exoskeleton provided with two legs each having a foot, the method comprising the implementation by data-processing means of a server, of steps of:

(a) obtaining at least one n-tuple of gait parameters defining a given gait of the exoskeleton;

(b) generating at least one periodic elementary trajectory of the exoskeleton for said n-tuple of gait parameters, while applying conditions such that said periodic elementary trajectory comprises in sequence a first trajectory portion and a second trajectory portion, such that:

in the first trajectory portion each foot performs a pure rotation, and in the second trajectory portion only one foot performs a translation starting with the foot that performs the translation being in contact with the ground only at a toe tip thereof and ending with the foot that performs the translation being in contact with the ground only at a heel thereof, while the foot that does not perform the translation remains immobile flat on the ground all along the second trajectory portion.

12. A means of storage that can be read by a piece of computer equipment whereon a computer program product is recorded comprising code instructions for the execution of a method for generating a trajectory of an exoskeleton provided with two legs each having a foot, the method comprising the implementation by data-processing means of a server, of steps of:

(a) obtaining at least one n-tuple of gait parameters defining a given gait of the exoskeleton;

(b) generating at least one periodic elementary trajectory of the exoskeleton for said n-tuple of gait parameters, while applying conditions such that said periodic elementary trajectory comprises in sequence a first trajectory portion and a second trajectory portion, such that:

in the first trajectory portion each foot performs a pure rotation, and in the second trajectory portion only one foot performs a translation starting with the foot that performs the translation being in contact with the ground only at a toe tip thereof and ending with the foot that performs the translation being in contact with the ground only at a heel thereof, while the foot that does not perform the translation remains immobile flat on the ground all along the second trajectory portion.

* * * * *